United States Patent
Abdelmalek et al.

(10) Patent No.: US 12,507,162 B2
(45) Date of Patent: Dec. 23, 2025

(54) ALLOWED NETWORK SLICE DETERMINATION BASED ON UE HISTORICAL BEHAVIOR

(71) Applicant: Verizon Patent and Licensing Inc., Basking Ridge, NJ (US)

(72) Inventors: Yousef Abdelmalek, New Providence, NJ (US); Helen Osias Eglip, Sammamish, WA (US); Parry Cornell Booker, Sunnyvale, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 846 days.

(21) Appl. No.: 17/740,445

(22) Filed: May 10, 2022

(65) Prior Publication Data

US 2023/0370963 A1    Nov. 16, 2023

(51) Int. Cl.
*H04W 48/18*        (2009.01)
(52) U.S. Cl.
CPC .................. *H04W 48/18* (2013.01)
(58) Field of Classification Search
CPC ..... H04W 48/18; H04W 48/14; H04W 12/06; H04W 48/16; H04W 72/21; H04W 72/23; H04W 88/06; H04W 16/02; H04W 24/02; H04W 36/0022; H04W 36/14; H04W 36/32; H04W 4/24; H04W 4/50; H04W 4/70; H04W 48/12; H04W 48/20; H04W 60/04; H04W 72/51; H04W 76/10; H04W 76/11; H04W 76/12; H04W 88/02; H04W 92/14
See application file for complete search history.

(56) References Cited

U.S. PATENT DOCUMENTS

| | | | |
|---|---|---|---|
| 11,632,714 B2* | 4/2023 | Opsenica | H04W 12/06 370/329 |
| 2017/0367036 A1* | 12/2017 | Chen | H04L 43/10 |
| 2018/0310238 A1* | 10/2018 | Opsenica | H04W 72/21 |

(Continued)

FOREIGN PATENT DOCUMENTS

WO    WO-2020156380 A1 *   8/2020   ......... H04L 41/0893

OTHER PUBLICATIONS

SuperGuide Corp. v. DirecTV Enters., Inc., 358 F.3d 870, 69 U.S.P.Q.2d 1865 (Fed. Cir. 2004), Court Opinion, Printed on Feb. 15, 2024 (Year: 2024).*

(Continued)

*Primary Examiner* — Matthew C Sams

(57) ABSTRACT

A network device, implementing a network function, receives a network slice request from a user equipment device (UE) that includes a requested network slice set in a network. The network device determines a first set of allowed network slices for the UE based on at least one of first network slices supported by a Radio Access Network (RAN), second network slices supported by the network function, third network slices to which the UE subscribes, or fourth network slices configured by a Network Slice Selection Function (NSSF) in the network. The network device obtains historical behavior data associated with the UE, and determines a second set of allowed network slices for the UE based on the first set and the historical behavior data associated with the UE. The network device returns the second set of allowed network slices to the UE.

19 Claims, 8 Drawing Sheets

(56) References Cited

U.S. PATENT DOCUMENTS

| | | | | |
|---|---|---|---|---|
| 2018/0352501 A1* | 12/2018 | Zhang | ................... | H04W 48/14 |
| 2019/0174320 A1* | 6/2019 | Kodaypak | ........... | H04L 41/5006 |
| 2020/0068074 A1* | 2/2020 | Cai | ....................... | H04M 15/66 |
| 2023/0042390 A1* | 2/2023 | Mildh | ................... | H04W 48/17 |
| 2023/0354172 A1* | 11/2023 | Yang | .................... | H04W 48/18 |
| 2024/0089820 A1* | 3/2024 | Mattam | ................ | H04W 36/14 |

OTHER PUBLICATIONS

Translation of WO2020/156380A1 (Year: 2020).*

* cited by examiner

ALLOWED NETWORK SLICE DETERMINATION BASED ON UE HISTORICAL BEHAVIOR

BACKGROUND

"Network Slicing" is an innovation that is being implemented in Next Generation Mobile Networks, such as Fifth Generation (5G) Mobile Networks. Network slicing is a type of virtualized networking architecture that involves partitioning of a single physical network into multiple virtual networks. The partitions, or "slices," of the virtualized network may be customized to meet the specific needs of applications, services, devices, customers, or operators. Each network slice can have its own architecture, provisioning management, and security that supports a particular application or service. Bandwidth, capacity, and connectivity functions are allocated within each network slice to meet the objective of the particular network slice. Network slicing may be implemented in a dynamic fashion, such that the slices of the virtualized network may change over time and may be re-customized to meet new or changing needs of applications, services, devices, customers, or operators.

DETAILED DESCRIPTION OF EXAMPLE EMBODIMENTS

Figure 1:
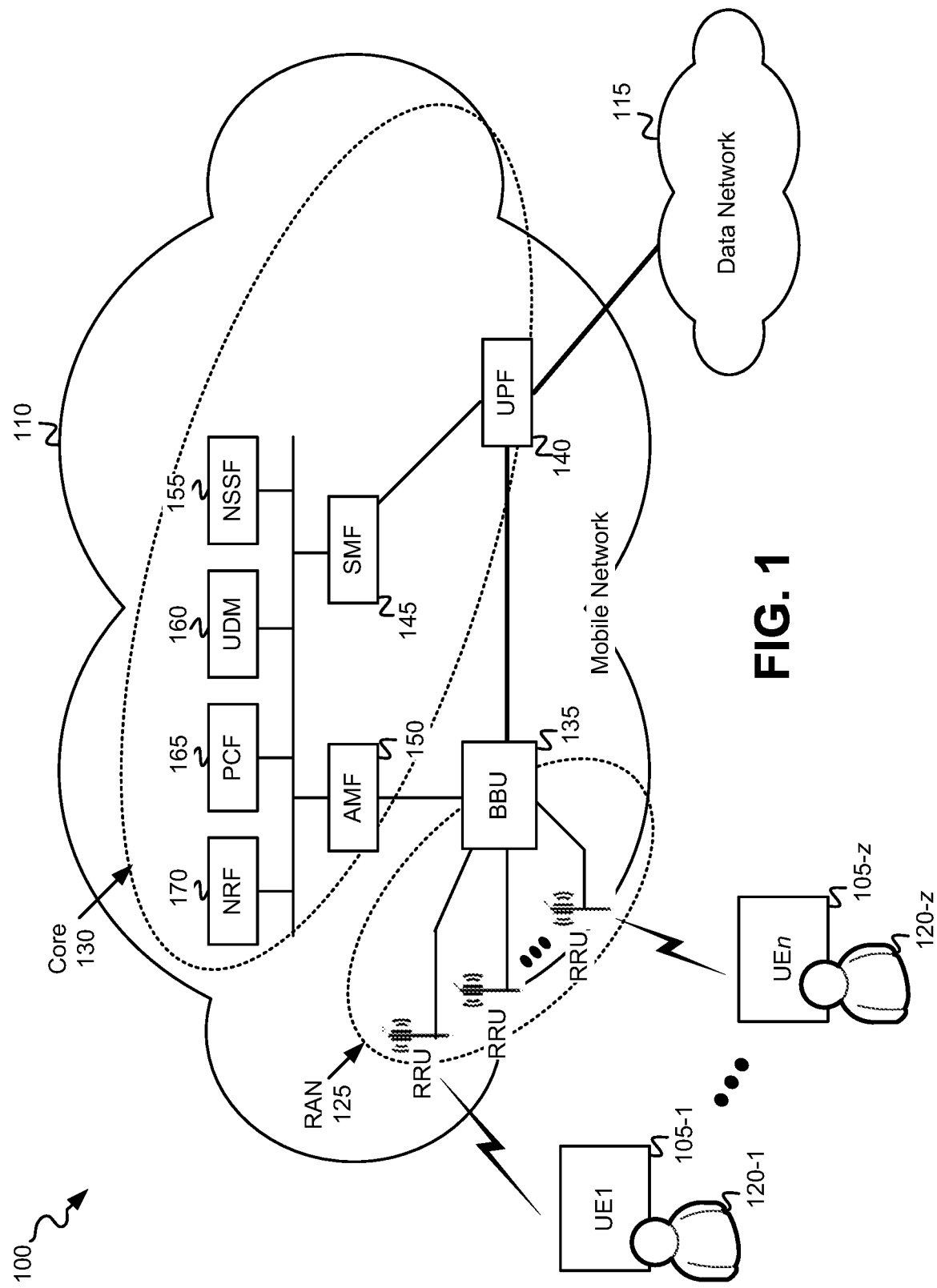
FIG. 1 depicts an example of a network environment in which allowed network slices, selected as described herein, are returned to requesting user equipment devices.

The following detailed description refers to the accompanying drawings. The same reference numbers in different drawings may identify the same or similar elements. The following detailed description does not limit the invention.

With Next Generation mobile networks, such as 5G New Radio (NR) networks, being designed to deliver multi-Gigabits per second (Gbps) peak data rates, ultra-low latency, massive network capacity, high reliability, and high availability mobile service, many new applications are likely to emerge to take advantage of the capabilities of these networks. Applications, such as factory automation, industrial Internet of Things (IoTs), Vehicle-to-Everything (V2X), virtual/augmented reality (VR/AR), and advanced telemedicine, may leverage the expanded capabilities of Next Generation mobile networks. Each different type of new application has its own network needs and requirements, thus, presenting a diverse range of requirements that may necessitate a wide variety of heterogenous services to be offered by the Next Generation mobile network. In order to meet this heterogeneity of network services, network slicing has been adopted in Next Generation networks. By slicing a mobile network into multiple logical networks, network slicing can support on-demand tailored services for distinct application scenarios on a common physical mobile network. Network slicing, therefore, enables the sharing of one common physical network infrastructure with multiple independent virtual networks such that each of the multiple virtual networks acts as an end-to-end network that may be dedicated to individual network services. Each virtual network of the network slicing is bound by its own Service Level Agreements (SLAs), Quality of Service (QoS) requirements, and/or a desired set of performance requirements (e.g., data rates, latency, capacity, reliability).

When a user equipment device (UE) registers in a mobile network, and sends a request for one or more network slices, the mobile network needs to determine what network slices are to be assigned for use by the UE. The allowed network slices are typically determined based on the following: 1) the set of network slices that have been configured in the mobile network by the Network Slice Selection Function (NSSF), 2) the set of network slices to which the UE has subscribed, 3) the set of network slices supported by the particular Access and Mobility Management Function (AMF) serving the UE, and/or 4) the set of network slices supported by the Radio Access Network (RAN) within the particular Tracking Area(s) serving the UE.

Example embodiments described herein determine network slices for assigning to a UE, as "allowed network slices," by selecting, based on historical UE behavior, a network slice selection option from multiple different network slice selection options and executing a sub-process associated with the selected option to determine network slices for assigning to the UE. In one example implementation, a first network slice selection option may be selected from the multiple different network slice selection options based on the UE exhibiting first types of behavior. For example, the first types of UE behavior may include the UE frequently activating and deactivating sessions, and/or infrequently moving between tracking areas in the Radio Area Network (RAN). In one example of the selected first network slice selection option, an allowed network slice set may be determined to include results of an intersection between multiple mobile network-maintained network slice sets (e.g., a NSSF-configured network slice set, an AMF-supported network slice set, a RAN-supported network slice set, and a UE subscribed network slice set), and further including at least one UE-requested network slice. The allowed network slice set, resulting from the first network slice selection option, results in a shorter tracking area identifier (TAI) list, associated with less paging overhead, being returned to the requesting UE. This first network slice selection option is, therefore, advantageous for UEs that frequently activate/deactivate Packet Data Unit (PDU) sessions and may require access to a larger set of allowed network slices, or which are less mobile and infrequently cross between tracking areas in the RAN and require fewer mobility registration updates.

Further, in this example implementation, a second network slice selection option may be selected from the multiple different network slice selection options based on the UE exhibiting second types of historical behavior. For example, the second types of UE historical behavior may include the UE infrequently activating and deactivating sessions, and/or frequently moving between tracking areas in the RAN. In one example of the second network slice selection option, the allowed network slice set may be determined to include results of an intersection between a "permitted" network slice set and a set of UE-requested network slices. The "permitted" network slice set may first be determined to include the results of an intersection between multiple mobile network-maintained network slice sets (e.g., a NSSF-configured network slice set, an AMF-supported network slice set, a RAN-supported network slice set, and a UE subscribed network slice set), and further including at least one UE-requested network slice. The allowed network slice set, resulting from the second network slice selection option, results in a longer TAI list, associated with more paging overhead, being returned to the requesting UE. This second network slice selection option is, therefore, advantageous for UEs that infrequently activate/deactivate PDU sessions and may only need access to a more limited set of allowed network slices, or which are more mobile and frequently cross between tracking areas in the RAN.

FIG. 1 depicts an example of a network environment 100 in which allowed network slices, selected as described herein, are returned to requesting user equipment devices (UEs). As shown, network environment 100 may include UEs 105-1 through 105-z (generically referred to herein as a "UE 105" or "UEs 105"), a mobile network 110, and a data network(s) 115.

UEs 105-1 through 105-z may each include any type of device having a communication capability such as, for example, a wireless communication capability. UEs 105 may include, for example, a laptop, palmtop, wearable, or tablet computer; a cellular phone (e.g., a "smart" phone); a Voice over Internet Protocol (VoIP) phone; an audio speaker (e.g., a "smart" speaker); a video gaming device; a music player (e.g., a digital audio player); a digital camera; a device in a vehicle; a wireless telematics device; an Augmented Reality/Virtual Reality (AR/VR) headset or glasses; or an Internet of Things (IoT) or Machine-to-Machine (M2M) device. A user may carry, use, administer, and/or operate each UE 105. A user 120-1 is shown in association with UE 105-1 and a user 120-z is shown in association with UE 105-z. A user 120 may alternatively be referred to herein as a "subscriber 120."

Mobile network 110 may include a Public Land Mobile Network (PLMN) (referred to herein as a "mobile network 110" or a "network 110") and possibly one or more other networks (not shown). Mobile network 110 may be composed of other sub-networks, such as a RAN 125 and a core network 130. RAN 125 may include various types of radio access equipment that implement Radio Frequency (RF) communication with UEs 105. The radio access equipment of RAN 125 may include, for example, multiple Remote Radio Units (RRUs) and at least one baseband unit (BBU) 135 (only a single BBU 135 is shown in FIG. 1, however, RAN 125 may include multiple BBUs). Each of the RRUs includes devices that operate as a radio function unit which transmit and receive RF signals to/from UEs 105. BBU 135 interconnects with the distributed RRUs of RAN 125 via fronthaul links or a fronthaul network. RAN 125 may additionally include other nodes, functions, and/or components not shown in FIG. 1. Though not shown in FIG. 1, in some implementations, BBU 135 may be functionally split into a centralized unit (CU) and one or more distributed units (DUs).

Core network 130 includes devices or nodes that perform network functions (NFs) that operate the mobile network 110 including, among other NFs, mobile network access management, session management, and policy control NFs. In the example network environment 100 of FIG. 1, core network 130 is shown as including a 5G mobile network that further includes 5G Network Functions (NFs), such as a User Plane Function (UPF) 140, a Session Management Function (SMF) 145, an Access and Mobility Management Function (AMF) 150, a Network Slice Selection Function (NSSF) 155, a Unified Data Management (UDM) function 160, a Policy Control Function (PCF) 165, and a Network Repository Function (NRF) 170. UPF 140, SMF 145, AMF 150, NSSF 155, UDM 160, PCF 160, and NRF 170 may be implemented as virtual network functions (VNFs) within mobile network 110.

UPF 140 may act as a router and a gateway between mobile network 110 and a data network 115, and forwards session data between data network 115 and RAN 125. Though only a single UPF 140 is shown in FIG. 1, mobile network 110 may include multiple UPFs 140 at various locations in network 110. SMF 145 performs session management, allocates network addresses to UEs 105, and selects and controls UPFs 140 for data transfer. AMF 150 performs authentication, authorization, and mobility management for UEs 105. AMF 150 may additionally assign "allowed network slices" to UEs 105, as described further herein. NSSF 155 configures and selects a set of network slices within mobile network 110 for serving UEs 105, and determines the single Network Slice Selection Assistance Information (S-NSSAI) for each network slice. NSSF 155 may assign each network slice a S-NSSAI value that uniquely identifies the network slice. In one implementation, the S-NSSAI value may include a Slice/Service Type (SST) value and a Slice Differentiator (SD) value (e.g., S-NSSAI=SST+SD). The SST may define the expected behavior of the network slice in terms of specific features and services. The SD value may be directly related to the SST value and may be used as an additional differentiator (e.g., if multiple network slices carry the same SST value). The S-NSSAIs of the network slices may be used within mobile network 110 for network slice selection, as described herein, for servicing UE sessions.

UDM 160 manages data for user access authorization, user registration, and data network profiles. UDM 160 may include, or operate in conjunction with, a User Data Repository (UDR—not shown) which stores user data, such as customer profile information, customer authentication information, user-subscribed network slice information, and encryption keys. PCF 165 implements policy and charging control for service data flows and Protocol Data Unit (PDU) session related policy control.

NRF 170 operates as a centralized repository of information regarding NFs in mobile network 110. NRF 170 enables NFs (e.g., UPF 140, SMF 145, AMF 150, UDM 160) to register and discover each other via an Application Programming interface (API). NRF 170 maintains an updated repository of information about the NFs available in mobile network 110, along with information about the services provided by each of the NFs. NRF 170 further enables the NFs to obtain updated status information of other NFs in mobile network 110. NRF 170 may, for example, maintain profiles of available NF instances and their supported services, allow NF instances to discover other NF instances in mobile network 110, and allow NF instances to track the status of other NF instances.

Data network 115 may include one or more interconnected networks, such as local area networks (LANs), wide area networks (WANs), metropolitan area networks (MANs), and/or the Internet. Data network 115 may connect with UPFs 140 of mobile network 110.

The configuration of network components of the example network environment 100 of FIG. 1 is for illustrative purposes. Other configurations may be implemented. Therefore, network environment 100 may include additional, fewer, and/or different components that may be configured in a different arrangement than that depicted in FIG. 1. For example, core network 130 may include other NFs not shown in FIG. 1. As a further example, though mobile network 110 is depicted in FIG. 1 as a 5G network having 5G network components/functions, mobile network 110 may alternatively include a 4G or 4.5G network with corresponding network components/functions, or a hybrid 5G/4G network that includes certain components of both a Next Generation network (e.g., a 5G network) and a 4G Long Term Evolution (LTE) network. Mobile network 110 may alternatively include another type of Next Generation network, other than the 5G network shown in FIG. 1. Additionally, though only a single one of each of the NFs UPF 140, SMF 145, AMF 150, NSSF 155, UDM 160, PCF 165, and NRF 170 is shown in FIG. 1, mobile network 110 may include multiple instances of each of these NFs. For example, each network slice may include its own SMF 145, PCF 165, and UPF 140.

Figure 2:
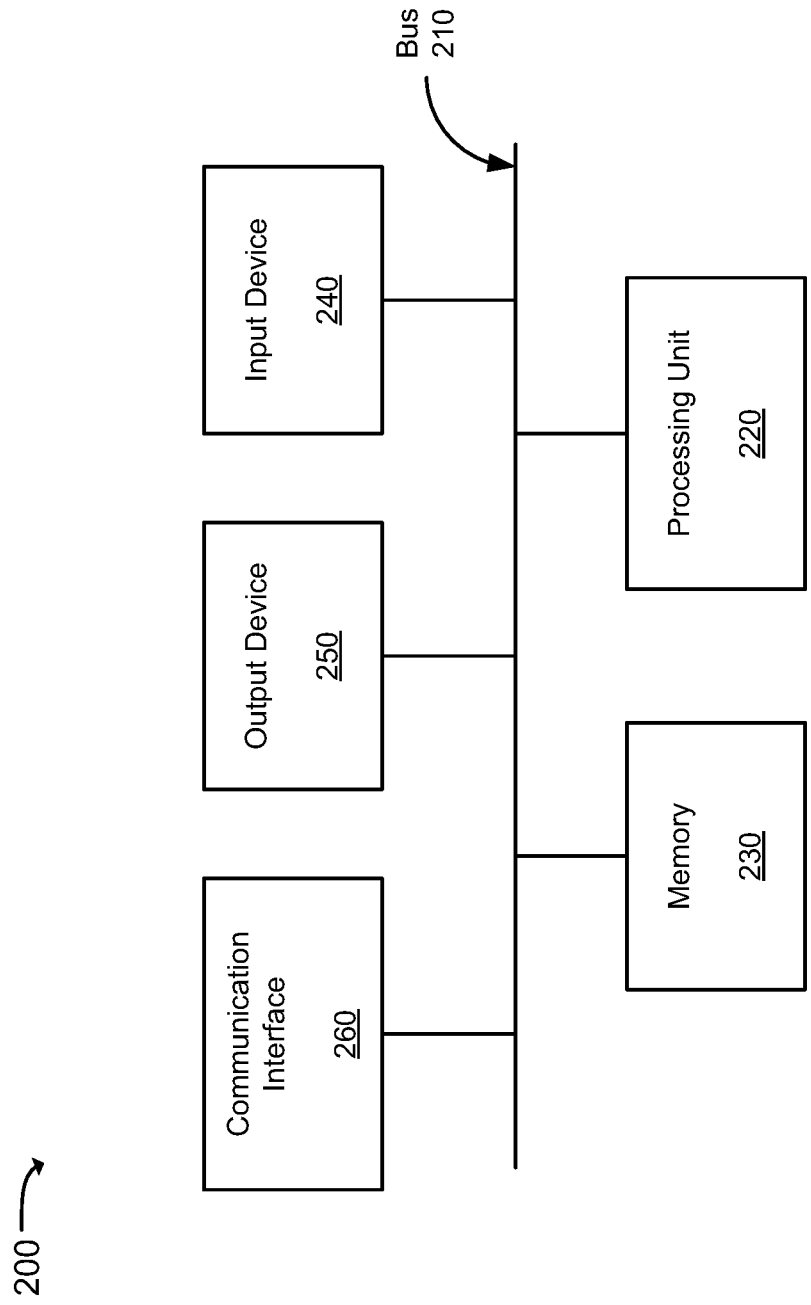
FIG. 2 depicts exemplary components of a network device that may correspond to various devices described herein, or which may implement various network functions described herein.

FIG. 2 is a diagram that depicts exemplary components of a network device 200 (referred to herein as a "network device" or a "device"). UEs 105, the RRUs of RAN 125, and BBU 135 may each include components that are the same as, or similar to, those of device 200 shown in FIG. 2. Furthermore, each of the NFs UPF 140, SMF 145, AMF 150, NSSF 155, UDM 160, PCF 165, and NRF 170 may be implemented by a network device that includes components that are the same as, or similar to, those of device 200. Some of the NFs UPF 140, SMF 145, AMF 150, NSSF 155, UDM 160, PCF 165, and NRF 170 may be implemented by a same device 200 within mobile network 110, while others of the functions may be implemented by one or more separate devices 200 within mobile network 110.

Device 200 may include a bus 210, a processing unit 220, a memory 230, an input device 240, an output device 250, and a communication interface 260. Bus 210 may include a path that permits communication among the components of device 200. Processing unit 220 may include one or more processors or microprocessors which may interpret and execute instructions, or processing logic. Memory 230 may include one or more memory devices for storing data and instructions. Memory 230 may include a random access memory (RAM) or another type of dynamic storage device that may store information and instructions for execution by processing unit 220, a Read Only Memory (ROM) device or another type of static storage device that may store static information and instructions for use by processing unit 220, and/or a magnetic, optical, or flash memory recording and storage medium. The memory devices of memory 230 may each be referred to herein as a "tangible non-transitory computer-readable medium," "non-transitory computer-readable medium," or "non-transitory storage medium." In some implementations, the processes/methods set forth herein can be implemented as instructions that are stored in memory 230 for execution by processing unit 220.

Input device 240 may include one or more mechanisms that permit an operator to input information into device 200, such as, for example, a keypad or a keyboard, a display with a touch sensitive panel, voice recognition and/or biometric mechanisms, etc. Output device 250 may include one or more mechanisms that output information to the operator, including a display, a speaker, etc. Input device 240 and output device 250 may, in some implementations, be implemented as a user interface (UI) that displays UI information and which receives user input via the UI. Communication interface 260 may include a transceiver(s) that enables device 200 to communicate with other devices and/or systems. For example, communication interface 260 may include one or more wired and/or wireless transceivers for communicating via mobile network 110 and/or data network 115. In the case of RRUs of RAN 125, communication interface 260 may further include one or more antenna arrays for implementing radio frequency (RF) cell sectors.

The configuration of components of network device 200 illustrated in FIG. 2 is for illustrative purposes. Other configurations may be implemented. Therefore, network device 200 may include additional, fewer and/or different components, that may be arranged in a different configuration, than depicted in FIG. 2.

Figure 3A:
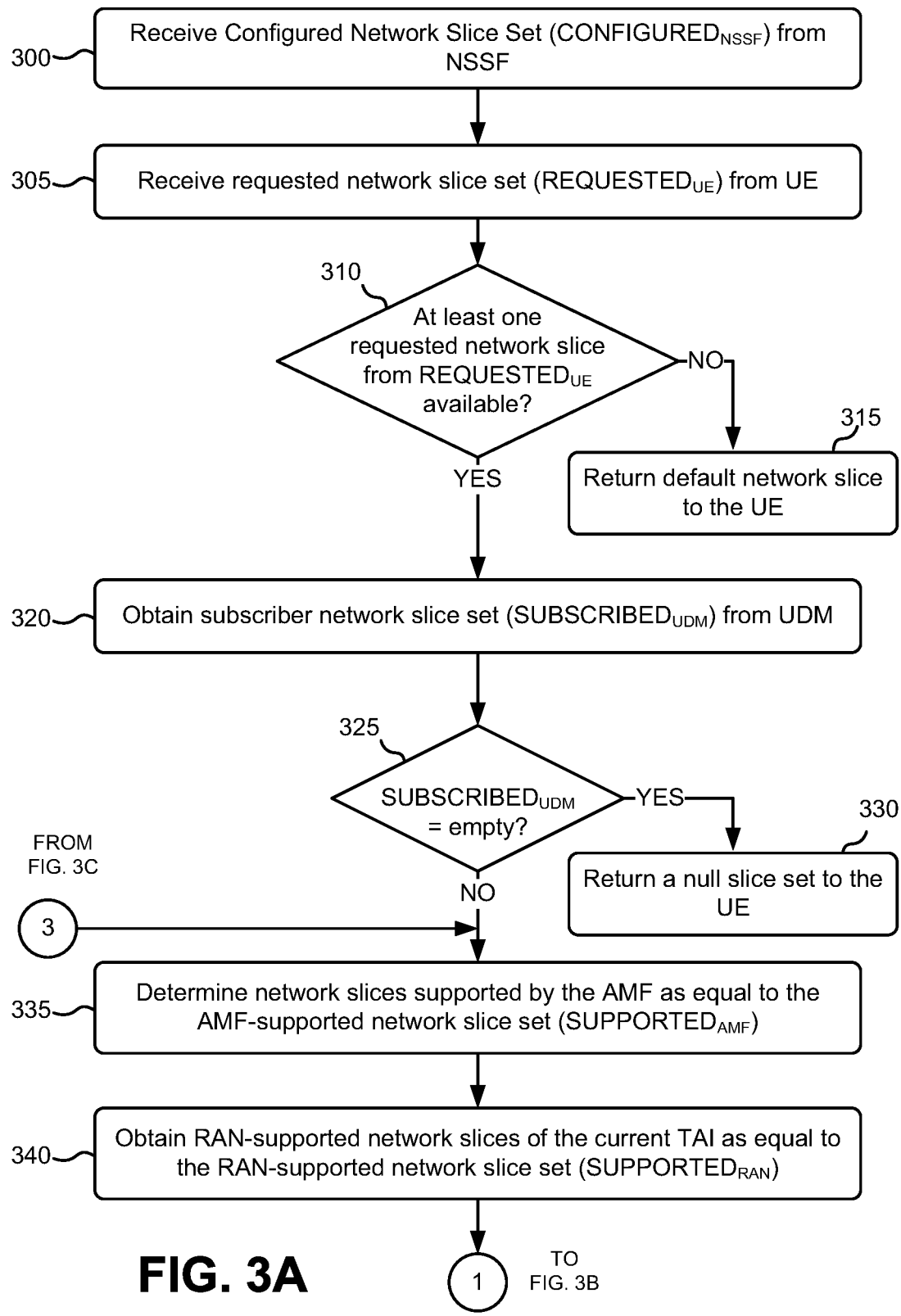
FIGS. 3A-3C are flow diagrams of an exemplary process for determining a set of allowed network slices for a user equipment device by a selected one of multiple different network slice selection options, selected based on the user equipment device's historical behavior.
Figure 3B:
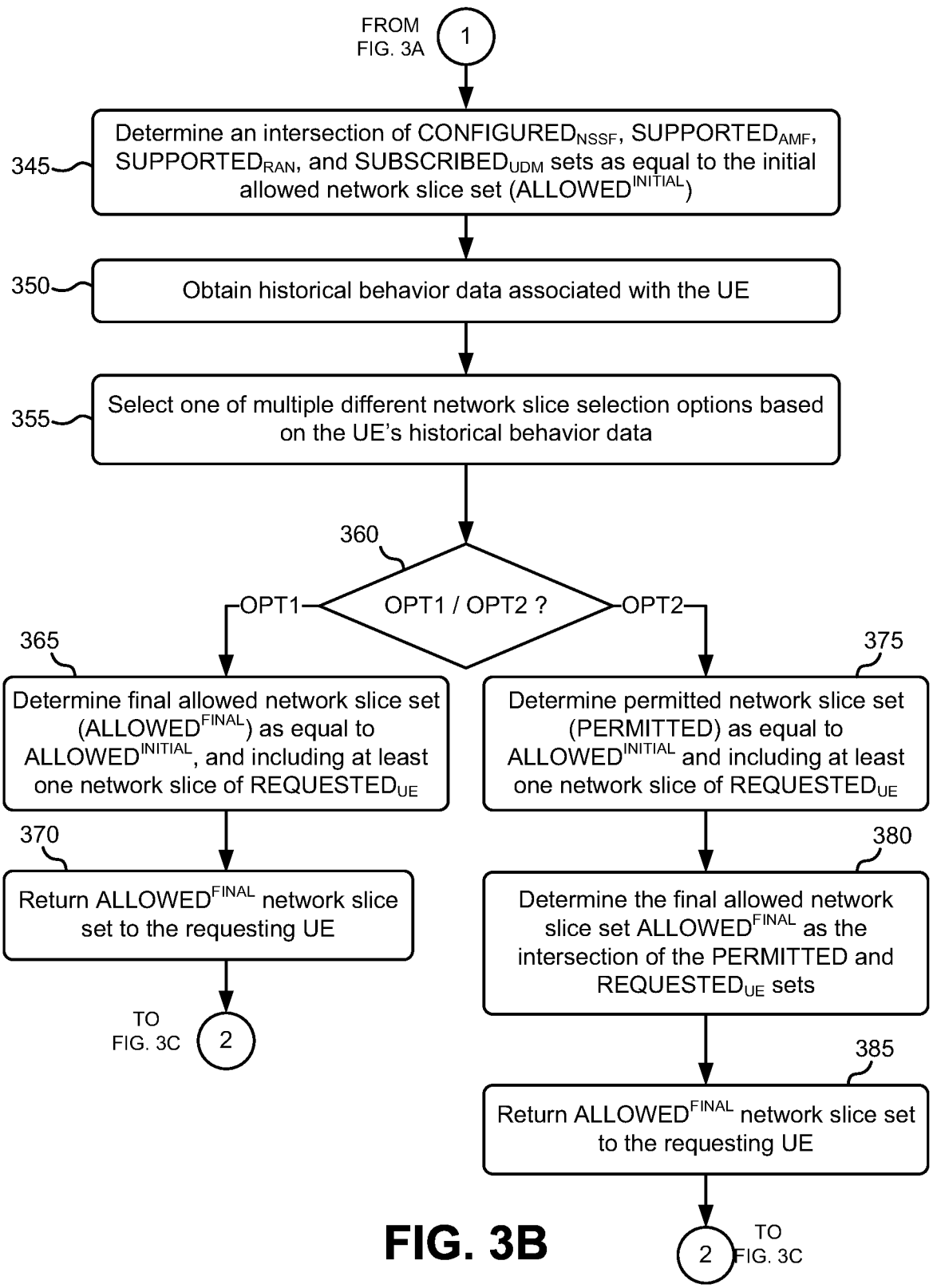
Figure 3C:
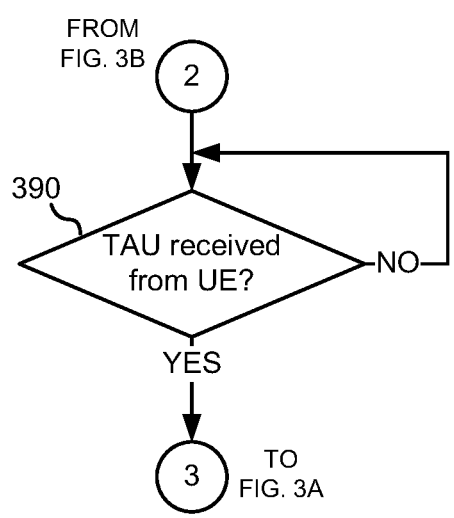

FIGS. 3A-3C are flow diagrams of an exemplary process for determining a set of allowed network slices for a UE 105 by selection and use of one of multiple different network slice selection options, selected based on, for example, the UE 105's historical behavior. In one implementation, the exemplary process of FIGS. 3A-3C may be implemented by AMF 150 of mobile network 110. In other implementations, the exemplary process of FIGS. 3A and 3B may be implemented by one or more other NFs in mobile network 110. The exemplary process of FIGS. 3A-3C is described with additional reference to FIG. 4.

Figure 4:
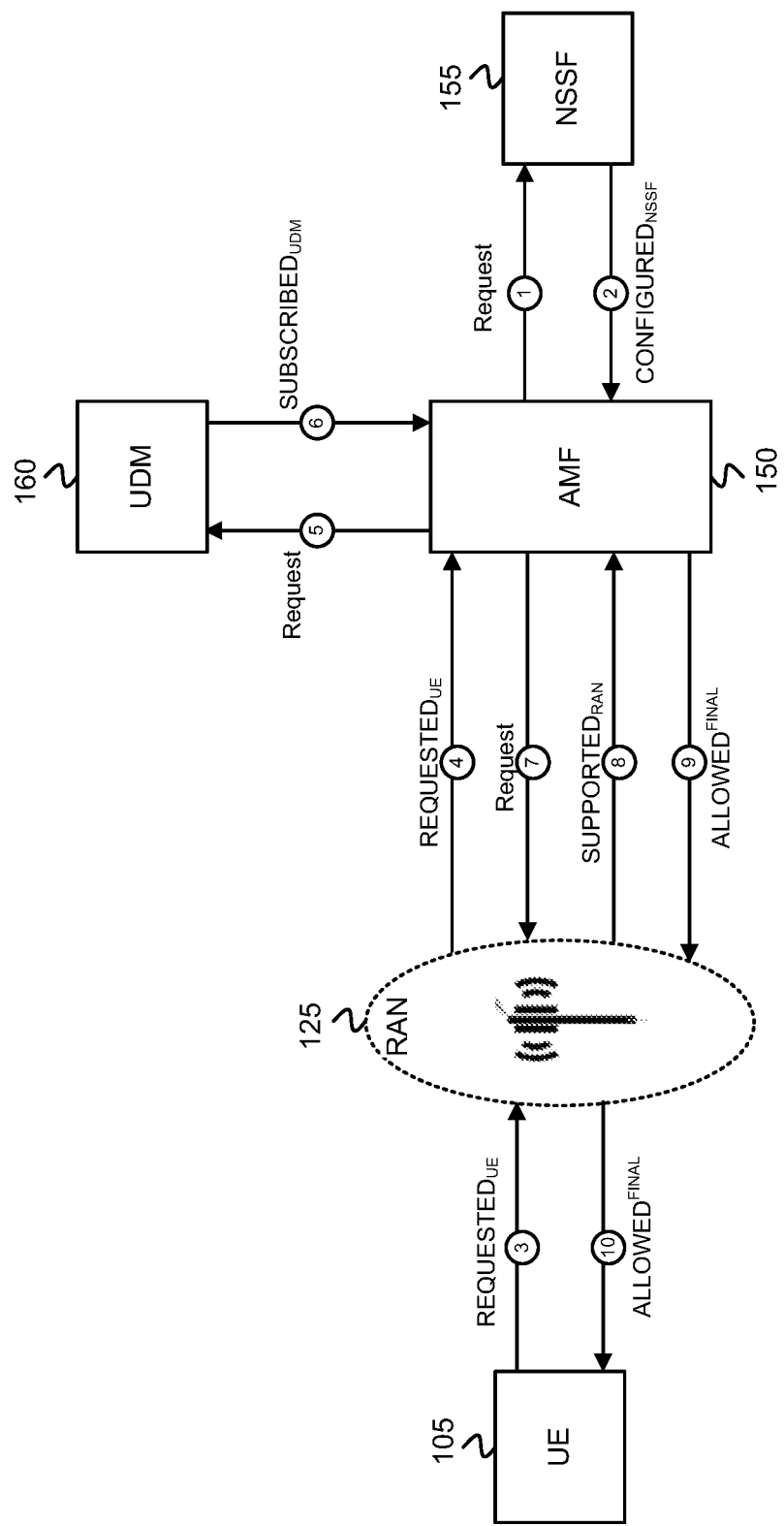
FIG. 4 depicts exemplary operations, messages, and/or data flows associated with an exemplary process.

The exemplary process includes AMF 150 receiving a configured network slice set (CONFIGURED$_{NSSF}$) from NSSF 155 (block 300). As previously described, NSSF 155 selects a set of network slices within mobile network 110 for serving UEs 105, assigning each network slice a S-NSSAI value that uniquely identifies the network slice. As a result of network slice configuration, NSSF 155 generates a set CONFIGURED$_{NSSF}$ that identifies each of the network slices that are currently configured within mobile network 110 for serving UEs 105. For example, if NSSF 155 has configured three network slices, with S-NSSAI=1, S-NSSAI=2, and S-NSSAI=3, then CONFIGURED$_{NSSF}$ would equal the set {1, 2, 3}. FIG. 4 depicts AMF 150 sending a request (identified with a "1" within a circle) for the configured network slices to NSSF 155, and NSSF 155 returning (identified with a "2") the set CONFIGURED$_{NSSF}$.

AMF 150 receives a requested network slice set (REQUESTED$_{UE}$) from the UE 105 (block 305). During UE registration with mobile network 110, the UE 105 sends a request for network slices, that are usable by UE 105, to mobile network 110. The UE 105 may identify, in the request, a set of particular network slices to be used by the UE 105 for a session(s). The set REQUESTED$_{UE}$ may, for example, identify one or more S-NSSAIs that are requested by the UE 105. FIG. 4 illustrates RAN 125 receiving (identified with a "3") the requested network slice set REQUESTED$_{UE}$ from UE 105, and RAN 125 forwarding (identified with a "4") the requested network slice set on to the AMF 150 which is currently handling UE 105.

AMF 150 determines if a requested network slice from REQUESTED$_{UE}$ is currently available (block 310). AMF 150 may compare the set REQUESTED$_{UE}$ with the set CONFIGURED$_{NSSF}$ to determine if there is at least one S-NSSAI within the CONFIGURED$_{NSSF}$ that matches a S-NSSAI in REQUESTED$_{UE}$. If none of the requested network slices of REQUESTED$_{UE}$ are currently available (NO—block 310), then AMF 150 returns a default network slice to the requesting UE 105 (block 315). AMF 150 may assign one or more network slices as default network slices for use, for example, when the network slices requested by a UE 105 are not currently available.

If at least one of the requested network slices of REQUESTED$_{UE}$ is available (YES—block 310), then AMF 150 obtains a subscriber network slice set (SUBSCRIBED$_{UDM}$) from UDM 160 (block 320). UDM 160 performs a lookup, based on an identifier (e.g., International Mobile Subscriber Identity (IMSI), Subscription Permanent Identifier (SUPI)) associated with UE 105, to retrieve network slice subscription information for the subscriber associated with the UE 105. FIG. 4 illustrates AMF 150 sending a request (identified with a "5") to UDM 160, and UDM 160 returning (identified with a "6") the SUB SCRIBED$_{UDM}$ set to AMF 150.

AMF 150 analyzes the obtained subscriber network slice set SUBSCRIBED$_{UDM}$ and determines if the set SUBSCRIBED$_{UDM}$ is empty (block 325). If set SUBSCRIBED$_{UDM}$ does not include any S-NSSAIs, then AMF 150 determines that SUBSCRIBED$_{UDM}$ is empty.

Conversely, if set SUBSCRIBED$_{UDM}$ includes at least one S-NSSAI, then AMF 150 determines that SUBSCRIBED$_{UDM}$ is not empty. If the subscriber network slice set SUBSCRIBED$_{UDM}$ is empty (YES— block 325), AMF 150 returns a null slice set {empty} to the requesting UE 105 (block 330). If the subscriber network slice set SUBSCRIBED$_{UDM}$ is not empty (NO— block 325), then AMF 150 determines network slices supported by AMF 150 as equal to the AMF-supported network slice set (SUPPORTED$_{AMF}$) (block 335). AMF 150 may currently only support one or more particular network slices that are identified in the set SUPPORTED$_{AMF}$, which AMF 150 may store in memory.

AMF 150 obtains RAN-supported network slices of the current Tracking Area (e.g., current Tracking Area Identifier (TAI)) as equal to the RAN-supported network slice set (SUPPORTED$_{RAN}$) (block 340). Each tracking area, identified by a TAI, of RAN 125 may support one or more particular network slices that are identified in the set SUPPORTED$_{RAN}$, which AMF 150 may obtain from RAN 125 (or from another node in mobile network 110). FIG. 4 illustrates AMF 150 sending a request (identified with a "7") to RAN 125, and RAN 125 returning (identified with an "8") the SUPPORTED$_{RAN}$ set to the AMF 150.

AMF 150 determines an intersection of the CONFIGURED$_{NSSF}$, SUPPORTED$_{AMF}$, SUPPORTED$_{RAN}$, and SUBSCRIBED$_{UDM}$ sets as equal to an initial allowed network slice set (ALLOWED$^{INITIAL}$) (block 345). Thus, ALLOWED$^{INITIAL}$=CONFIGURED$_{NSSF}$ ∩ SUPPORTED$_{AMF}$ ∩ SUPPORTED$_{RAN}$ ∩ SUBSCRIBED$_{UDM}$. As one example, if CONFIGURED$_{NSSF}$={1, 2, 3, 4}, SUPPORTED$_{AMF}$={1, 2, 3, 4}, SUPPORTED$_{RAN}$={1, 2, 3} and SUBSCRIBED$_{UDM}$={1, 2}, then ALLOWED$^{INITIAL}$={1, 2}.

AMF 150 obtains historical behavior data associated with the requesting UE 105 (block 350). The historical behavior data associated with the UE 105 may include, for example, how frequently UE 105 activates or deactivates PDU sessions, or switches between PDU sessions. The historical behavior data may further include how frequently or infrequently the UE 105 transits between tracking areas within RAN 125.

AMF 150 selects one of multiple different network slice selection options based on the UE 105's historical behavior data (block 355). Each network slice selection option may involve a different network slice selection sub-process for selecting a particular group of network slices for inclusion in the set of allowed network slices (ALLOWED$^{FINAL}$) that is be returned to the requesting UE 105. In one example implementation described herein, AMF 150 may select one of two different network slice selection options based on the UE 105's historical behavior data (designated as option 1 (OPT1) and option 2 (OPT2)). However, in other implementations, AMF 150 may select from greater than two different network slice selection options.

In this example implementation, AMF 150 may select a first network slice selection option (OPT1) if the UE 105 has been exhibiting first types of behavior. For example, the first types of UE behavior may include the UE 105 frequently activating and deactivating sessions, and/or infrequently moving or crossing between tracking areas in the RAN 125. AMF 150, by analyzing the UE 105's historical behavior, may determine that the UE 105 frequently activates and deactivates sessions and/or the UE 105 infrequently crosses or moves between tracking areas in the RAN 125 and, consequently, may select the first network slice selection option (OPT1), described further below, for determining the "allowed network slices" to be assigned to the requesting UE 105.

Furthermore, in this example implementation, AMF 150 may select a second network slice selection option (OPT2) if the UE 105 has been exhibiting second types of behavior. For example, the second types of UE behavior may include the UE 105 infrequently activating and deactivating sessions, and/or frequently moving or crossing between tracking areas in the RAN 125. AMF 150, by analyzing the UE 105's historical behavior, may determine that the UE 105 infrequently activates and deactivates sessions and/or the UE 105 frequently crosses or moves between tracking areas in the RAN 125 and, consequently, may select the second network slice selection option (OPT2), described further below, for determining the "allowed network slices" to be assigned to the requesting UE 105.

In the example implementation that includes two different network slice selection options, if AMF 150 selects a first network slice selection option (OPT1— block 360), then AMF 150 performs a first network slice selection sub-process that involves blocks 365 and 370. Execution of this first sub-process includes AMF 150 determining a final allowed network slice set (ALLOWED$^{FINAL}$) as equal to the ALLOWED$^{INITIAL}$ set and including at least one network slice of the REQUESTED$_{UE}$ set (block 365), and returning the ALLOWED' network slice set to the requesting UE 105 (block 370). In this first sub-process, AMF 150 uses the ALLOWED$^{INITIAL}$ set obtained in block 345 and includes at least one S-NSSAI, from the REQUESTED$_{UE}$ set received from the UE 105 in block 305, to create the ALLOWED$^{FINAL}$ set. If the ALLOWED$^{INITIAL}$ set determined in block 345, however, contains an empty set ({empty}), then ALLOWED$^{FINAL}$ is set equal to an empty set. AMF 105 then sends the ALLOWED$^{FINAL}$ set to the UE 105 for use in establishing PDU sessions via mobile network 110. AMF 105 may also return an updated TAI list to the UE 105 along with the ALLOWED$^{FINAL}$ set. The TAI list may include a list of Tracking Area Codes (TACs) of the tracking areas that have a same ALLOWED$^{FINAL}$ set. The process then continues at block 390 in FIG. 3C, described further below. FIG. 4 illustrates AMF 150 sending (identified with a "9") the ALLOWED$^{FINAL}$ set to RAN 125 which, in turn, forwards (identified with a "10" the ALLOWED$^{FINAL}$ set to UE 105.

If AMF 150 selects a second network slice selection option (OPT2— block 360), then AMF 150 performs a second network slice selection sub-process that involves blocks 375-385. Execution of this second sub-process includes AMF 150 determining a permitted network slice set (PERMITTED) as equal to the ALLOWED$^{INITIAL}$ set and including at least one network slice of REQUESTED$_{UE}$ (block 375), determining the final allowed network slice set ALLOWED$^{FINAL}$ as an intersection of the PERMITTED and REQUESTED$_{UE}$ sets (block 380), and returning the ALLOWED$^{FINAL}$ network slice set to the requesting UE 105 (block 385). In this second sub-process, AMF 150 uses the ALLOWED$^{INITIAL}$ set obtained in block 345 and includes at least one S-NSSAI from the REQUESTED$_{UE}$ set received from the UE 105 in block 305, to create the PERMITTED set. If the ALLOWED$^{INITIAL}$ set determined in block 345, however, contains an empty set ({empty}), then the PERMITTED is determined to be an empty set. AMF 150 then determines the ALLOWED$^{FINAL}$ set by taking an intersection of the PERMITTED set of block 375 and the REQUESTED$_{UE}$ set received from the UE 105 in block 305. AMF 105 then sends the ALLOWED$^{FINAL}$ set to the UE 105 for use in establishing PDU sessions via mobile network 110. AMF 105 may also return an updated TAI list to the UE 105 along with the ALLOWED$^{FINAL}$ set. FIG. 4 illustrates AMF 150 sending (identified with a "9") the ALLOWED$^{FINAL}$ set to RAN 125 which, in turn, forwards (identified with a "10") the ALLOWED$^{FINAL}$ set to UE 105.

Subsequent to returning the ALLOWED$^{FINAL}$ network slice to the requesting UE (blocks 370 or 385), AMF 150 determines if a Tracking Area Update (TAU) has been received from the UE 105 (block 390). If the UE 105 travels, within RAN 125, outside of the TACs indicated in the latest updated TAI list, UE 105, or RAN 125, sends a TAU to the AMF 150 currently serving the UE 105 to notify AMF 150 of the change in the TAC. AMF 150 subsequently repeats blocks 335-355, and either blocks 365-370 or blocks 375-385, to re-determine an updated ALLOWED$^{FINAL}$ network slice set for the UE 105.

Figure 5:
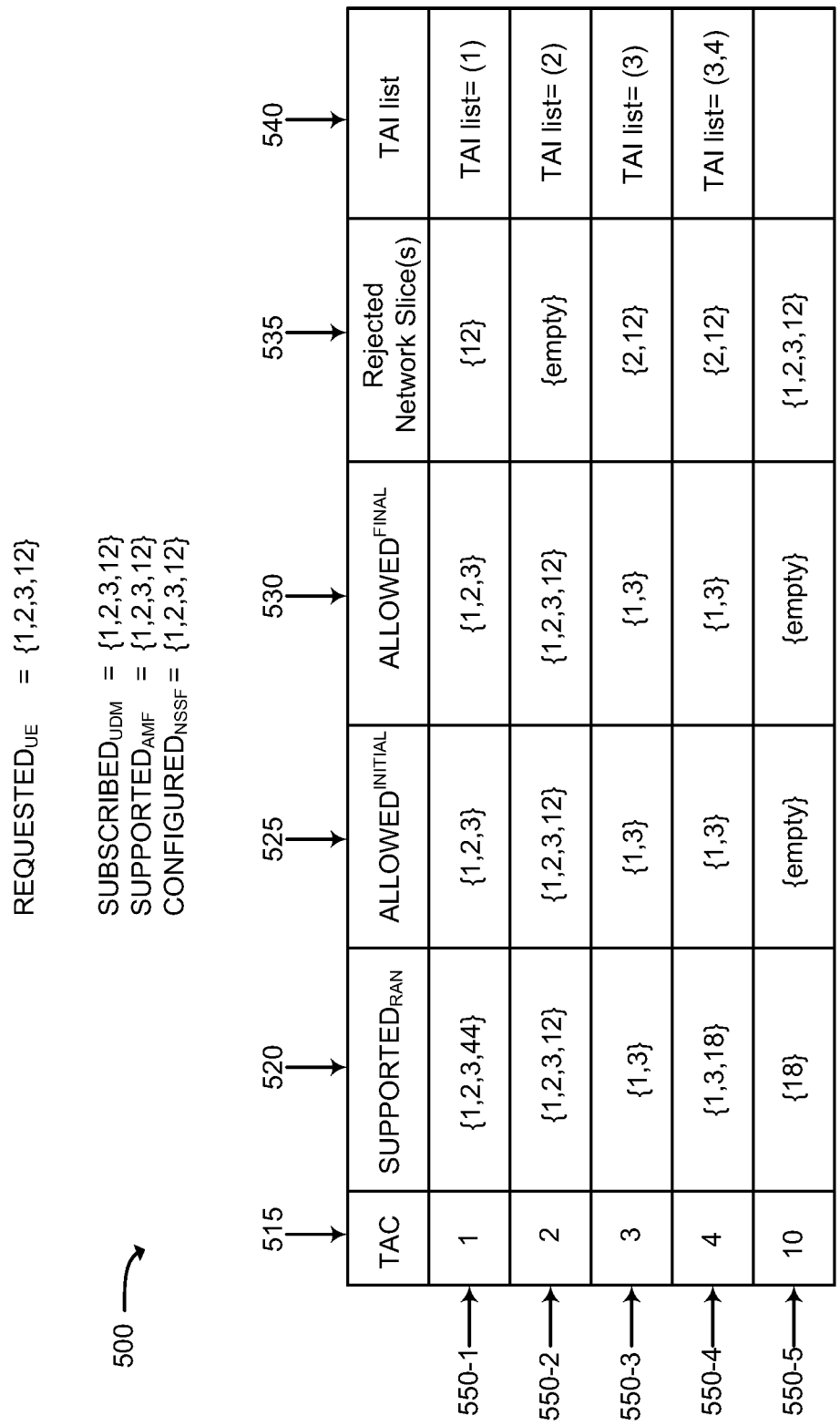
FIGS. 5 and 6 illustrate tables representing examples of the implementation of different exemplary network slice selection options, described herein, for selecting allowed network slices for user equipment devices.

FIG. 5 illustrates a first table 500 representing an example of the implementation of the example process of FIGS. 3A-3C, with the first network slice selection option, described above with respect to blocks 365 and 370, being used for determining allowed network slices for a UE 105. In the example of table 500, a UE 105 has sent a network slice request that includes a set of requested network slices REQUESTED$_{UE}$={1, 2, 3, 12}. The AMF 150 (not shown in FIG. 5) currently serving the UE 105, subsequent to receiving the network slice request from the UE 105, determines that SUBSCRIBED$_{UDM}$={1, 2, 3, 12}, SUPPORTED$_{AMF}$={1, 2, 3, 12}, and CONFIGURED$_{NSSF}$={1, 2, 3, 12}. As shown at the intersection of the TAC column 515 and row 550-1 in table 500, with the UE 105 currently located in tracking area TAC=1, AMF 150 determines that the network slices supported by the RAN 125 for TAC=1 is SUPPORTED$_{RAN}$={1, 2, 3, 44} (shown in row 550-1 at column 520). The AMF 150 then determines (e.g., block 345, FIG. 3B) the intersection of the sets SUBSCRIBED$_{UDM}$, SUPPORTED$_{AMF}$, CONFIGURED$_{NSSF}$, and SUPPORTED$_{RAN}$ and sets the resulting set equal to the set ALLOWED$^{INITIAL}$. As shown at the intersection of row 550-1 and column 525, ALLOWED$^{INITIAL}$={1, 2, 3}. In this example, with the UE 105 currently located in TAC=1, the AMF 105 selects network slice selection option 1 (at blocks 355 and 360) based on the UE 105's historical behavior, and determines the final allowed network slice set ALLOWED$^{FINAL}$ as equal to ALLOWED$^{INITIAL}$ plus at least one network slice of REQUESTED$_{UE}$. Since ALLOWED$^{INITIAL}$={1, 2, 3} and REQUESTED$_{UE}$={1, 2, 3, 12}, then ALLOWED$^{FINAL}$ is set equal to {1, 2, 3} (as shown at the intersection of row 550-1 and column 530). Given that the UE 105 requested S-NSSAIs 1, 2, 3 and 12, and the allowed network slice set only includes S-NSSAIs 1, 2, and 3, then AMF 150 determines that the requested S-NSSAI 12 is rejected (shown at the intersection of row 550-1 and column 535). The AMF 150 further generates a TAI list that includes TAC=1 (shown at the intersection of row 550-1 and column 540).

Subsequently, the UE 105 may move into a tracking area identified by TAC=2 (shown at the intersection of row 550-2 and column 515). With the UE 105 currently located in tracking area TAC=2, AMF 150 determines that the network slices supported by the RAN 125 for TAC=2 is SUPPORTED$_{RAN}$={1, 2, 3, 12} (shown in row 550-2 at column 520). The AMF 150 then determines (e.g., block 345, FIG. 3B) the intersection of the sets SUBSCRIBED$_{UDM}$, SUPPORTED$_{AMF}$, CONFIGURED$_{NSSF}$, and SUPPORTED$_{RAN}$ and sets the resulting set equal to the set ALLOWED$^{INITIAL}$. As shown at the intersection of row 550-2 and column 525, ALLOWED$^{INITIAL}$={1, 2, 3, 12}. In this example, with the UE 105 currently located in TAC=2, the AMF 105 selects network slice selection option 1 (at blocks 355 and 360) based on the UE 105's historical behavior, and determines the final allowed network slice set ALLOWED$^{FINAL}$ as equal to ALLOWED$^{INITIAL}$ plus at least one network slice of REQUESTED$_{UE}$. Since ALLOWED$^{INITIAL}$={1, 2, 3, 12} and REQUESTED$_{UE}$={1, 2, 3, 12}, then ALLOWED$^{FINAL}$ is set equal to {1, 2, 3, 12} (as shown at the intersection of row 550-2 and column 530). Given that the UE 105 requested S-NSSAIs 1, 2, 3 and 12, and the allowed network slice set also includes S-NSSAIs 1, 2, 3, and 12 then AMF 150 determines that there are no rejected S-NSSAIs (e.g., an empty set {empty}) (shown at the intersection of row 550-2 and column 535). The AMF 150 further generates a TAI list that includes TAC=2 (shown at the intersection of row 550-2 and column 540).

The UE 105 may then move into a tracking area identified by TAC=3 (shown at the intersection of row 550-3 and column 515). With the UE 105 currently located in tracking area TAC=3, AMF 150 determines that the network slices supported by the RAN 125 for TAC=3 is SUPPORTED$_{RAN}$={1, 3} (shown in row 550-3 at column 520). The AMF 150 then determines (e.g., block 345, FIG. 3B) the intersection of the sets SUBSCRIBED$_{UDM}$, SUPPORTED$_{AMF}$, CONFIGURED$_{NSSF}$, and SUPPORTED$_{RAN}$ and sets the resulting set equal to the set ALLOWED$^{INITIAL}$. As shown at the intersection of row 550-3 and column 525, ALLOWED$^{INITIAL}$={1, 3}. In this example, with the UE 105 currently located in TAC=3, the AMF 105 selects network slice selection option 1 (at blocks 355 and 360) based on the UE 105's historical behavior, and determines the final allowed network slice set ALLOWED$^{FINAL}$ as equal to ALLOWED$^{INITIAL}$ plus at least one network slice of REQUESTED$_{UE}$. Since ALLOWED$^{INITIAL}$={1, 3} and REQUESTED$_{UE}$={1, 2, 3, 12}, then ALLOWED$^{FINAL}$ is set equal to {1, 3} (as shown at the intersection of row 550-3 and column 530). Given that the UE 105 requested S-NSSAIs 1, 2, 3 and 12, and the allowed network slice set only includes S-NSSAIs 1 and 3, then AMF 150 determines that S-NSSAIs 2 and 12 are rejected (e.g., set {2, 12}) (shown at the intersection of row 550-3 and column 535). The AMF 150 further generates a TAI list that includes TAC=3 (shown at the intersection of row 550-3 and column 540).

Subsequently, the UE 105 may move into another tracking area identified by TAC=4 (shown at the intersection of row 550-4 and column 515). With the UE 105 currently located in tracking area TAC=4, AMF 150 determines that the network slices supported by the RAN 125 for TAC=4 is SUPPORTED$_{RAN}$={1, 3, 18} (shown in row 550-4 at column 520). The AMF 150 then determines (e.g., block 345, FIG. 3B) the intersection of the sets SUBSCRIBED$_{UDM}$, SUPPORTED$_{AMF}$, CONFIGURED$_{NSSF}$, and SUPPORT- $ED_{RAN}$ and sets the resulting set equal to the set $ALLOWED^{INITIAL}$. As shown at the intersection of row 550-4 and column 525, $ALLOWED^{INITIAL}=\{1, 3\}$. In this example, with the UE 105 currently located in TAC=4, the AMF 105 selects network slice selection option 1 (at blocks 355 and 360) based on the UE 105's historical behavior, and determines the final allowed network slice set $ALLOWED^{FINAL}$ as equal to $ALLOWED^{INITIAL}$, and includes at least one network slice of $REQUESTED_{UE}$. Since $ALLOWED^{INITIAL}=\{1, 3\}$ and $REQUESTED_{UE}=\{1, 2, 3, 12\}$, then $ALLOWED^{FINAL}$ is set equal to $\{1, 3\}$ (as shown at the intersection of row 550-4 and column 530). Given that the UE 105 requested S-NSSAIs 1, 2, 3 and 12, and the allowed network slice set only includes S-NSSAIs 1 and 3, then AMF 150 determines that S-NSSAIs 2 and 12 are rejected (e.g., set $\{2, 12\}$) (shown at the intersection of row 550-4 and column 535). The AMF 150 further generates a TAI list that includes TAC=3 and TAC=4, since the allowed network slice sets associated with both TAC=3 and TAC=4 equal the same set of allowed network slices (shown at the intersection of row 550-4 and column 540).

The UE 105 may subsequently move into a tracking area identified by TAC=10 (shown at the intersection of row 550-5 and column 515). With the UE 105 currently located in tracking area TAC=10, AMF 150 determines that the network slices supported by the RAN 125 for TAC=10 is $SUPPORTED_{RAN}=\{18\}$ (shown in row 550-5 at column 520). The AMF 150 then determines (e.g., block 345, FIG. 3B) the intersection of the sets $SUBSCRIBED_{UDM}$, $SUPPORTED_{AMF}$, $CONFIGURED_{NSSF}$, and $SUPPORTED_{RAN}$ and sets the resulting set equal to the set $ALLOWED^{INITIAL}$. As shown at the intersection of row 550-5 and column 525, $ALLOWED^{INITIAL}=\{empty\}$. In this example, with the UE 105 currently located in TAC=10, the AMF 105 selects network slice selection option 1 (at blocks 355 and 360) based on the UE 105's historical behavior, and determines the final allowed network slice set $ALLOWED^{FINAL}$ as equal to $ALLOWED^{INITIAL}$, and including at least one network slice of $REQUESTED_{UE}$. Since $ALLOWED^{INITIAL}=\{18\}$ and $REQUESTED_{UE}=\{1, 2, 3, 12\}$, then $ALLOWED^{FINAL}$ is set equal to $\{empty\}$ (as shown at the intersection of row 550-5 and column 530). Given that the UE 105 requested S-NSSAIs 1, 2, 3 and 12, and the allowed network slice set is an empty set, then AMF 150 determines that S-NSSAIs 1, 2, 3 and 12 are rejected (e.g., set $\{1, 2, 3, 12\}$) (shown at the intersection of row 550-5 and column 535). AMF 150 may further return a "No network slices available" message to the requesting UE 105.

Figure 6:
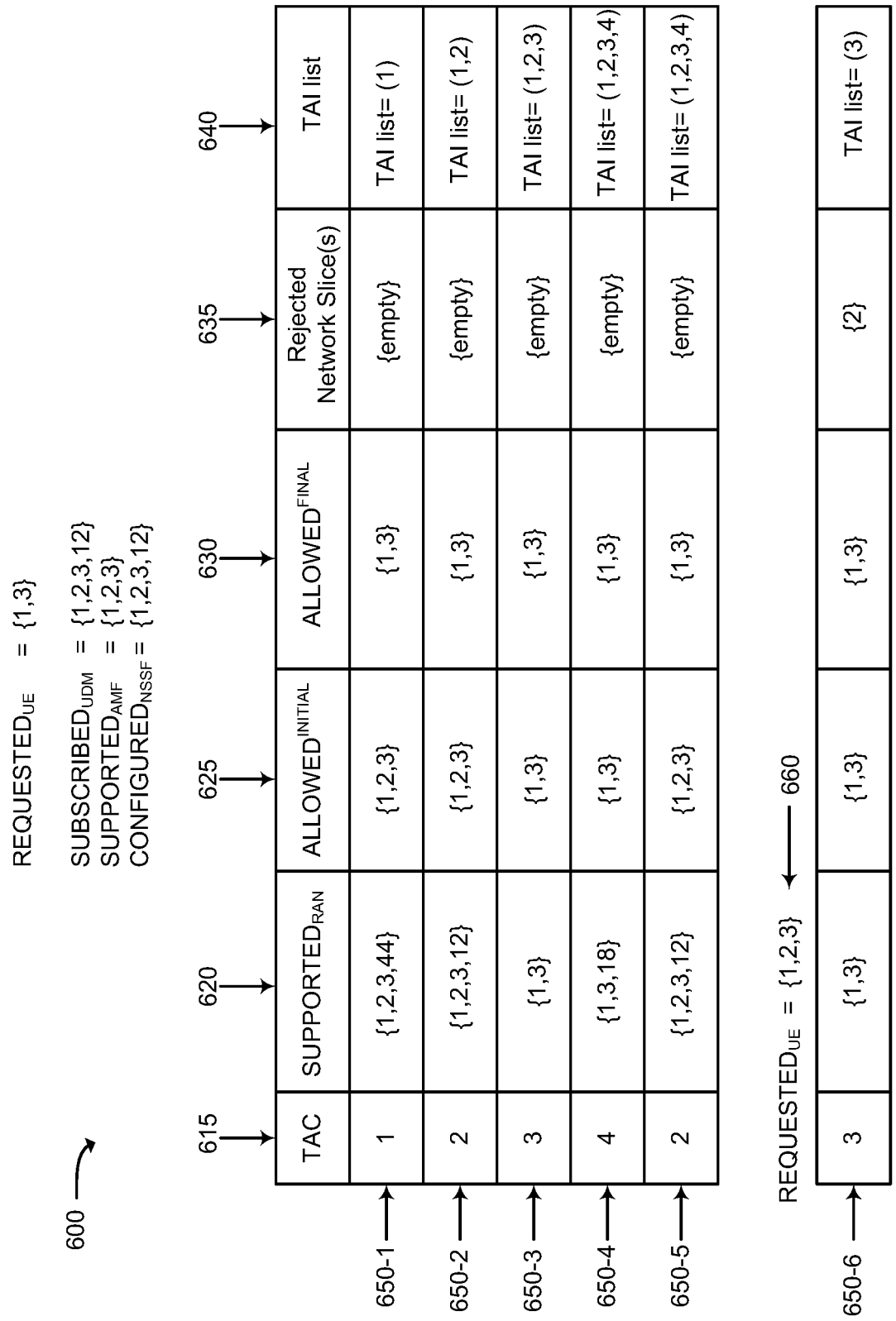

FIG. 6 illustrates a second table 600 representing another example of the implementation of the example process of FIGS. 3A-3C, with the second network slice selection option, described above with respect to blocks 375, 380, and 385, being used for determining allowed network slices for a UE 105. In the example of table 600, a UE 105 has sent a network slice request that includes a set of requested network slices $REQUESTED_{UE}=\{1, 3\}$. The AMF 150 (not shown in FIG. 6) currently serving the UE 105, subsequent to receiving the network slice request from the UE 105, determines that $SUBSCRIBED_{UDM}=\{1, 2, 3, 12\}$, $SUPPORTED_{AMF}=\{1, 2, 3\}$, and $CONFIGURED_{NSSF}=\{1, 2, 3, 12\}$. As shown at the intersection of the TAC column 615 and row 650-1 in table 600, with the UE 105 currently located in tracking area TAC=1, AMF 150 determines that the network slices supported by the RAN 125 for TAC=1 is $SUPPORTED_{RAN}=\{1, 2, 3, 44\}$ (shown in row 650-1 at column 620). The AMF 150 then determines (e.g., block 345, FIG. 3B) the intersection of the sets $SUBSCRIBED_{UDM}$, $SUPPORTED_{AMF}$, $CONFIGURED_{NSSF}$, and $SUPPORTED_{RAN}$ and sets the resulting set equal to the set $ALLOWED^{INITIAL}$. As shown at the intersection of row 650-1 and column 625, $ALLOWED^{INITIAL}=\{1, 2, 3\}$. In this example, with the UE 105 currently located in TAC=1, the AMF 105 selects network slice selection option 2 (at blocks 375, 380, and 385) based on the UE 105's historical behavior, and determines the permitted network slice set PERMITTED as equal to the $ALLOWED^{INITIAL}$ set, and including at least one network slice of $REQUESTED_{UE}$. In this example, since $ALLOWED^{INITIAL}=\{1, 2, 3\}$ and $REQUESTED_{UE}=\{1, 3\}$, then PERMITTED set equal to $\{1, 2, 3\}$. The AMF 105 then determines the final allowed network slice set $ALLOWED^{FINAL}$ as the intersection of the PERMITTED and $REQUESTED_{UE}$ sets. Since $PERMITTED=\{1, 2, 3\}$ and $REQUESTED_{UE}=\{1, 3\}$, then $ALLOWED^{FINAL}$ is set equal to $\{1, 3\}$ (as shown at the intersection of row 650-1 and column 630). Given that the UE 105 requested S-NSSAIs 1 and 3, and the allowed network slice set includes S-NSSAIs 1 and 3, then AMF 150 determines that the rejected network slice set is empty ($\{empty\}$) (shown at the intersection of row 650-1 and column 635). The AMF 150 further generates a TAI list that includes TAC=1 (shown at the intersection of row 650-1 and column 640).

Subsequently, the UE 105 may move into a tracking area identified by TAC=2 (shown at the intersection of row 650-2 and column 615). With the UE 105 currently located in tracking area TAC=2, AMF 150 determines that the network slices supported by the RAN 125 for TAC=2 is $SUPPORTED_{RAN}=\{1, 2, 3, 12\}$ (shown in row 650-2 at column 620). The AMF 150 then determines (e.g., block 345, FIG. 3B) the intersection of the sets $SUBSCRIBED_{UDM}$, $SUPPORTED_{AMF}$, $CONFIGURED_{NSSF}$, and $SUPPORTED_{RAN}$ and sets the resulting set equal to the set $ALLOWED^{INITIAL}$. As shown at the intersection of row 650-2 and column 625, $ALLOWED^{INITIAL}=\{1, 2, 3\}$. In this example, with the UE 105 currently located in TAC=2, the AMF 105 selects network slice selection option 2 (at blocks 375, 380, and 385) based on the UE 105's historical behavior, and then determines the permitted network slice set PERMITTED as equal to the $ALLOWED^{INITIAL}$ set, and including at least one network slice of $REQUESTED_{UE}$. In this example, since $ALLOWED^{INITIAL}=\{1, 2, 3\}$ and $REQUESTED_{UE}=\{1, 3\}$, then PERMITTED set equal to $\{1, 2, 3\}$. The AMF 105 then determines the final allowed network slice set $ALLOWED^{FINAL}$ as the intersection of the PERMITTED and $REQUESTED_{UE}$ sets. Since $PERMITTED=\{1, 2, 3\}$ and $REQUESTED_{UE}=\{1, 3\}$, then $ALLOWED^{FINAL}$ is set equal to $\{1, 3\}$ (as shown at the intersection of row 650-2 and column 630). Given that the UE 105 requested S-NSSAIs 1 and 3, and the allowed network slice set includes S-NSSAIs 1 and 3, then AMF 150 determines that the rejected network slice set is empty ($\{empty\}$) (shown at the intersection of row 650-2 and column 635). The AMF 150 further generates a TAI list that includes TACs of (1, 2) (shown at the intersection of row 650-2 and column 640).

The UE 105 may subsequently move into another tracking area identified by TAC=3 (shown at the intersection of row 650-3 and column 615). With the UE 105 currently located in tracking area TAC=3, AMF 150 determines that the network slices supported by the RAN 125 for TAC=3 is $SUPPORTED_{RAN}=\{1, 3\}$ (shown in row 650-3 at column 620). The AMF 150 then determines (e.g., block 345, FIG. 3B) the intersection of the sets $SUBSCRIBED_{UDM}$, $SUPPORTED_{AMF}$, $CONFIGURED_{NSSF}$, and $SUPPORTED_{RAN}$ and sets the resulting set equal to the set $ALLOWED^{INITIAL}$.

As shown at the intersection of row 650-3 and column 625, ALLOWED$^{INITIAL}$={1, 3}. In this example, with the UE 105 currently located in TAC=3, the AMF 105 selects network slice selection option 2 (at blocks 375, 380, and 385) based on the UE 105's historical behavior, and then determines the permitted network slice set PERMITTED as equal to the ALLOWED$^{INITIAL}$ set, and including at least one network slice of REQUESTED$_{UE}$. In this example, since ALLOWED$^{INITIAL}$={1, 3} and REQUESTED$_{UE}$={1, 3}, then PERMITTED set equal to {1, 3}. The AMF 105 then determines the final allowed network slice set ALLOWED$^{FINAL}$ as the intersection of the PERMITTED and REQUESTED$_{UE}$ sets. Since PERMITTED={1, 3} and REQUESTED$_{UE}$={1, 3}, then ALLOWED$^{FINAL}$ is set equal to {1, 3} (as shown at the intersection of row 650-3 and column 630). Given that the UE 105 requested S-NSSAIs 1 and 3, and the allowed network slice set includes S-NSSAIs 1 and 3, then AMF 150 determines that the rejected network slice set is empty ({empty}) (shown at the intersection of row 650-3 and column 635). The AMF 150 further generates a TAI list that includes TACs (1, 2, 3) (shown at the intersection of row 650-3 and column 640).

In example of table 600, the UE 105 subsequently moves into a tracking area identified by TAC=4 (shown at the intersection of row 650-4 and column 615). With the UE 105 currently located in tracking area TAC=4, AMF 150 determines that the network slices supported by the RAN 125 for TAC=4 is SUPPORTED$_{RAN}$={1, 3, 18} (shown in row 650-4 at column 620). The AMF 150 then determines (e.g., block 345, FIG. 3B) the intersection of the sets SUBSCRIBED$_{UDM}$, SUPPORTED$_{AMF}$, CONFIGURED$_{NSSF}$, and SUPPORTED$_{RAN}$ and sets the resulting set equal to the set ALLOWED$^{INITIAL}$. As shown at the intersection of row 650-4 and column 625, ALLOWED$^{INITIAL}$={1, 3}. In this example, with the UE 105 currently located in TAC=4, the AMF 105 selects network slice selection option 2 (at blocks 375, 380, and 385) based on the UE 105's historical behavior, and then determines the permitted network slice set PERMITTED as equal to the ALLOWED$^{INITIAL}$ set, and including at least one network slice of REQUESTED$_{UE}$. In this example, since ALLOWED$^{INITIAL}$={1, 3} and REQUESTED$_{UE}$={1, 3}, then PERMITTED set equal to {1, 3}. The AMF 105 then determines the final allowed network slice set ALLOWED$^{FINAL}$ as the intersection of the PERMITTED and REQUESTED$_{UE}$ sets. Since PERMITTED={1, 3} and REQUESTED$_{UE}$={1, 3}, then ALLOWED$^{FINAL}$ is set equal to {1, 3} (as shown at the intersection of row 650-4 and column 630). Given that the UE 105 requested S-NSSAIs 1 and 3, and the allowed network slice set includes S-NSSAIs 1 and 3, then AMF 150 determines that the rejected network slice set is empty ({empty}) (shown at the intersection of row 650-4 and column 635). The AMF 150 further generates a TAI list that includes TACs of (1, 2, 3, 4) (shown at the intersection of row 650-4 and column 640).

Subsequently, the UE 105 may move and return to the tracking area identified by TAC=2 (shown at the intersection of row 650-5 and column 615). With the UE 105 currently located again in tracking area TAC=2, AMF 150 determines that the network slices currently supported by the RAN 125 for TAC=2 is SUPPORTED$_{RAN}$={1, 2, 3, 12} (shown in row 650-5 at column 620). The AMF 150 then determines (e.g., block 345, FIG. 3B) the intersection of the sets SUBSCRIBED$_{UDM}$, SUPPORTED$_{AMF}$, CONFIGURED$_{NSSF}$, and SUPPORTED$_{RAN}$ and sets the resulting set equal to the set ALLOWED$^{INITIAL}$. As shown at the intersection of row 650-5 and column 625, ALLOWED$^{INITIAL}$={1, 2, 3}. In this example, with the UE 105 currently located in TAC=2, the AMF 105 selects network slice selection option 2 (at blocks 375, 380, and 385) based on the UE 105's historical behavior, and then determines the permitted network slice set PERMITTED as equal to the ALLOWED$^{INITIAL}$ set, and including at least one network slice of REQUESTED$_{UE}$. In this example, since ALLOWED$^{INITIAL}$={1, 2, 3} and REQUESTED$_{UE}$={1, 3}, then PERMITTED set equal to {1, 2, 3}. The AMF 105 then determines the final allowed network slice set ALLOWED$^{FINAL}$ as the intersection of the PERMITTED and REQUESTED$_{UE}$ sets. Since PERMITTED={1, 3} and REQUESTED$_{UE}$={1, 2, 3}, then ALLOWED$^{FINAL}$ is set equal to {1, 3} (as shown at the intersection of row 650-5 and column 630). Given that the UE 105 requested S-NSSAIs 1 and 3, and the allowed network slice set includes S-NSSAIs 1 and 3, then AMF 150 determines that the rejected network slice set is empty ({empty}) (shown at the intersection of row 650-5 and column 635). The AMF 150 further generates a TAI list that includes TACs (1, 2, 3, 4) (shown at the intersection of row 650-5 and column 640).

The UE 105 subsequently moves and returns to the tracking area identified by TAC=3 (shown at the intersection of row 650-6 and column 615) and also sends a new network slice request to AMF 150 that includes the set REQUESTED$_{UE}$={1, 2, 3} (shown at 660 in FIG. 6). With the UE 105 currently located in tracking area TAC=3, AMF 150 determines that the network slices currently supported by the RAN 125 for TAC=3 is SUPPORTED$_{RAN}$={1, 3} (shown in row 650-6 at column 620). The AMF 150 then determines (e.g., block 345, FIG. 3B) the intersection of the sets SUBSCRIBED$_{UDM}$, SUPPORTED$_{AMF}$, CONFIGURED$_{NSSF}$, and SUPPORTED$_{RAN}$ and sets the resulting set equal to the set ALLOWED$^{INITIAL}$. As shown at the intersection of row 650-6 and column 625, ALLOWED$^{INITIAL}$={1, 3}. In this example, with the UE 105 currently located in TAC=3, the AMF 105 selects network slice selection option 2 (at blocks 375, 380, and 385) based on the UE 105's historical behavior, and then determines the permitted network slice set PERMITTED as equal to the ALLOWED$^{INITIAL}$ set, and including at least one network slice of REQUESTED$_{UE}$. In this example, since ALLOWED$^{INITIAL}$={1, 3} and REQUESTED$_{UE}$={1, 3}, then PERMITTED set is equal to {1, 3}. The AMF 105 then determines the final allowed network slice set ALLOWED$^{FINAL}$ as the intersection of the PERMITTED and REQUESTED$_{UE}$ sets. Since PERMITTED={1, 3} and REQUESTED$_{UE}$={1, 2, 3}, then ALLOWED$^{FINAL}$ is set equal to {1, 3} (as shown at the intersection of row 650-6 and column 630). Given that the UE 105 requested S-NSSAIs 1, 2, and 3, and the allowed network slice set only includes S-NSSAIs 1 and 3, then AMF 150 determines that the rejected network slice set includes S-NSSAI=2 ({2}) (shown at the intersection of row 650-6 and column 635). The AMF 150 further generates a TAI list that includes TAC 3 (shown at the intersection of row 650-6 and column 640).

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 3A-3C, and sequences of operations, messages, and/or data flows with respect to FIG. 4, the order of the blocks and/or the operations, messages, and/or data flows may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processing unit 220) of a device. A non-transitory storage medium includes one or more of the storage mediums described in relation to memory 230. The non-transitory computer-readable storage medium may be implemented in a centralized, distributed, or logical division that may include a single physical memory device or multiple physical memory devices spread across one or multiple network devices.

To the extent the aforementioned embodiments collect, store or employ personal information of individuals, such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

All structural and functional equivalents to the elements of the various aspects set forth in this disclosure that are known or later come to be known to those of ordinary skill in the art are expressly incorporated herein by reference and are intended to be encompassed by the claims.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a network function, a network slice request from a user equipment device (UE) that includes a requested network slice set in a network;
   determining, by the network function, a first set of allowed network slices for the UE based on first network slices supported by a Radio Access Network (RAN), second network slices supported by the network function, third network slices to which the UE subscribes, and fourth network slices configured by a Network Slice Selection Function (NSSF) in the network;
   obtaining, by the network function, historical behavior data associated with the UE;
   determining, by the network function, a second set of allowed network slices for the UE based on the first set and the requested network slice set and further based on the historical behavior data, wherein determining the second set of allowed network slices for the UE further comprises:
   selecting from multiple different network slice selection sub-procedures based on whether the historical behavior data associated with the UE indicates frequent or infrequent UE activation or deactivation of sessions, or frequent or infrequent movement between tracking areas in the RAN; and
   determining the second set of allowed network slices for the UE using the selected sub-procedure from the multiple different network slice selection sub-procedures; and
   returning, by the network function, the second set of allowed network slices to the UE.

2. The method of claim 1, wherein the first network slices comprise a first group of network slices supported by the RAN within a current Tracking Area of the RAN,
   wherein the second network slices comprise a second group of network slices that are currently supported by the network function,
   wherein the third network slices comprise a third group of network slices to which a subscriber associated with the UE currently subscribes, and
   wherein the fourth network slices comprise a fourth group of network slices configured by the NSSF for use by UEs in the network.

3. The method of claim 2, wherein determining the first set of allowed network slices for the UE is based on the first group of network slices, the second group of network slices, the third group of network slices, and the fourth group of network slices.

4. The method of claim 2, wherein determining the first set of allowed network slices for the UE further comprises:
   determining an intersection of the first group of network slices, the second group of network slices, the third group of network slices, and the fourth group of network slices.

5. The method of claim 1, wherein selecting from the multiple different network slice selection sub-procedures further comprises:
  selecting a first one of the multiple different network slice selection sub-procedures when the historical behavior data indicates that the UE frequently activates and deactivates sessions or infrequently moves between tracking areas in the RAN; and
  selecting a second one of the multiple different network slice selection sub-procedures when the historical behavior data indicates that the UE infrequently activates and deactivates sessions or frequently moves between tracking areas in the RAN.

6. The method of claim 5, wherein the first one of the multiple different network slice selection sub-procedures comprises:
  determining the second set of allowed network slices as equal to the first set of allowed network slices and including at least one network slice of the requested network slice set; and
  wherein the second one of the multiple different network slice selection sub-procedures comprises:
  determining the second set of allowed network slices as an intersection of the requested network slice set and the first set of allowed network slices.

7. The method of claim 5, wherein selecting from the multiple different network slice selection sub-procedures further comprises:
  determining the second set of allowed network slices for the UE using the selected first one or the selected second one of the multiple different network slice selection sub-procedures.

8. A network device, comprising:
  at least one communication interface configured to communicate via a network; and
  at least one processor configured to execute a network function to:
    receive a network slice request from a user equipment device (UE) that includes a requested network slice set in the network;
    determine a first set of allowed network slices for the UE based on first network slices supported by a Radio Access Network (RAN), second network slices supported by the network function, third network slices to which the UE subscribes, and fourth network slices configured by a Network Slice Selection Function (NSSF) in the network;
    obtain historical behavior data associated with the UE;
    determine a second set of allowed network slices for the UE based on the first set and the requested network slice set and further based on the historical behavior data; and
    return the second set of allowed network slices to the UE,
    wherein, when determining the second set of allowed network slices for the UE, the at least one processor is further configured to execute the network function to:
      select from multiple different network slice selection sub-procedures based on whether the historical behavior data associated with the UE indicates frequent or infrequent UE activation or deactivation of sessions, or frequent or infrequent movement between tracking areas in the RAN; and
      determine the second set of allowed network slices for the UE using the selected sub-procedure from the multiple different network slice selection sub-procedures.

9. The network device of claim 8, wherein the first network slices comprise a first group of network slices supported by the RAN within a current Tracking Area of the RAN,
  wherein the second network slices comprise a second group of network slices that are currently supported by the network function,
  wherein the third network slices comprise a third group of network slices to which a subscriber associated with the UE currently subscribes, and
  wherein the fourth network slices comprise a fourth group of network slices configured by the NSSF for use by UEs in the network.

10. The network device of claim 9, wherein, when determining the first set of allowed network slices for the UE, the at least one processor is further configured to:
  determine the first set of allowed network slices for the UE based on the first group of network slices, the second group of network slices, the third group of network slices, and the fourth group of network slices.

11. The network device of claim 9, wherein, when determining the first set of allowed network slices for the UE, the at least one processor is further configured to:
  determine an intersection of the first group of network slices, the second group of network slices, the third group of network slices, and the fourth group of network slices.

12. The network device of claim 8, wherein, when selecting from the multiple different network slice selection sub-procedures, the at least one processor is further configured to:
  select a first one of the multiple different network slice selection sub-procedures when the historical behavior data indicates that the UE frequently activates and deactivates sessions or infrequently moves between tracking areas in the RAN; and
  select a second one of the multiple different network slice selection sub-procedures when the historical behavior data indicates that the UE infrequently activates and deactivates sessions or frequently moves between tracking areas in the RAN.

13. The network device of claim 12, wherein, when selecting from the multiple different network slice selection sub-procedures, the at least one processor is further configured to:
  determine the second set of allowed network slices for the UE using the selected first one or the selected second one of the multiple different network slice selection sub-procedures.

14. The network device of claim 12, wherein, when selecting the first one of the multiple different network slice selection sub-procedures, the at least one processor is further configured to:
  determine the second set of allowed network slices as equal to the first set of allowed network slices and including at least one network slice of the requested network slice set; and
  wherein, when selecting the second one of the multiple different network slice selection sub-procedures, the at least one processor is further configured to:
  determine the second set of allowed network slices as an intersection of the requested network slice set and the first set of allowed network slices.

15. A non-transitory storage medium storing instructions executable by a network function in a network device, wherein the instructions comprise instructions to cause the network function to:
- receive a network slice request from a user equipment device (UE) that includes a requested network slice set in a network;
- determine a first set of allowed network slices for the UE based on first network slices supported by a Radio Access Network (RAN), second network slices supported by the network function, third network slices to which the UE subscribes, and fourth network slices configured by a Network Slice Selection Function (NSSF) in the network;
- obtain historical behavior data associated with the UE;
- determine a second set of allowed network slices for the UE based on the first set and the requested network slice set and further based on the historical behavior data; and
- return the second set of allowed network slices to the UE,
- wherein the instructions to cause the network function to determine the second set of allowed network slices for the UE further comprise instructions to cause the network function to:
  - select from multiple different network slice selection sub-procedures based on whether the historical behavior data associated with the UE indicates frequent or infrequent UE activation or deactivation of sessions, or frequent or infrequent movement between tracking areas in the RAN; and
  - determine the second set of allowed network slices for the UE using the selected sub-procedure from the multiple different network slice selection sub-procedures.

16. The non-transitory storage medium of claim 15, wherein the instructions to cause the network function to determine the first set of allowed network slices for the UE further comprise instructions to cause the network function to:
- determine an intersection of the first network slices, the second network slices, the third network slices, and the fourth network slices.

17. The non-transitory storage medium of claim 15, wherein the instructions to cause the network function to select from the multiple different network slice selection sub-procedures further comprise instructions to cause the network function to:
- select a first one of the multiple different network slice selection sub-procedures when the historical behavior data indicates that the UE frequently activates and deactivates sessions or infrequently moves between tracking areas in the RAN; and
- select a second one of the multiple different network slice selection sub-procedures when the historical behavior data indicates that the UE infrequently activates and deactivates sessions or frequently moves between tracking areas in the RAN.

18. The non-transitory storage medium of claim of claim 17, wherein the instructions to cause the network function to select the first one of the multiple different network slice selection sub-procedures further comprises instructions to cause the network function to:
- determine the second set of allowed network slices as equal to the first set of allowed network slices and including at least one network slice of the requested network slice set, and
- wherein the instructions to cause the network function to select the second one of the multiple different network slice selection sub-procedures further comprises instructions to cause the network function to:
- determine the second set of allowed network slices as an intersection of the requested network slice set and the first set of allowed network slices.

19. The non-transitory storage medium of claim 17, wherein the instructions to cause the network function to select from the multiple different network slice selection sub-procedures further comprise instructions to cause the network function to:
- determine the second set of allowed network slices for the UE using the selected first one or the selected second one of the multiple different network slice selection sub-procedures.

* * * * *